(12) United States Patent
Liu

(10) Patent No.: US 11,561,627 B2
(45) Date of Patent: Jan. 24, 2023

(54) METHOD AND APPARATUS FOR CONTROLLING ROTATION OF DISPLAYED IMAGE, DISPLAY APPARATUS, AND COMPUTER-PROGRAM PRODUCT

(71) Applicant: BOE Technology Group Co., Ltd., Beijing (CN)

(72) Inventor: Cheng Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 477 days.

(21) Appl. No.: 16/754,675

(22) PCT Filed: Oct. 8, 2019

(86) PCT No.: PCT/CN2019/109938
§ 371 (c)(1),
(2) Date: Apr. 8, 2020

(87) PCT Pub. No.: WO2020/155663
PCT Pub. Date: Aug. 6, 2020

(65) Prior Publication Data
US 2021/0233212 A1 Jul. 29, 2021

(30) Foreign Application Priority Data
Feb. 2, 2019 (CN) .......................... 201910107399.6

(51) Int. Cl.
*G06F 3/0346* (2013.01)
*H04M 1/72454* (2021.01)

(52) U.S. Cl.
CPC .... *G06F 3/0346* (2013.01); *G06F 2200/1614* (2013.01); *G06F 2200/1637* (2013.01); *H04M 1/72454* (2021.01); *H04M 2250/12* (2013.01)

(58) Field of Classification Search
CPC ........... G06F 3/0346; G06F 2200/1614; G06F 2200/1637; H04M 1/72454; H04M 2250/12
See application file for complete search history.

(56) References Cited

U.S. PATENT DOCUMENTS

| 9,035,875 B1 * | 5/2015 | Tseng ....................... G09G 5/00 345/156 |
| 2002/0021278 A1 | 2/2002 | Hinckley et al. |

(Continued)

FOREIGN PATENT DOCUMENTS

| CN | 101800816 A | 8/2010 |
| CN | 103902185 A | 7/2014 |

(Continued)

OTHER PUBLICATIONS

International Search Report & Written Opinion dated Jan. 14, 2020, regarding PCT/CN2019/109938.

(Continued)

*Primary Examiner* — Maurice L. McDowell, Jr.
(74) *Attorney, Agent, or Firm* — Intellectual Valley Law, P.C.

(57) ABSTRACT

A method for controlling rotation of an image displayed in a display screen includes establishing a coordinate system with an origin being set at a center of the display screen. The coordinate system includes a coordinate plane in parallel to an average plane associated with the display screen. The method further includes dividing the coordinate plane to four azimuth intervals corresponding respectively to four display modes with four boundary lines being all intersected at the origin of the coordinate system. Additionally, the method includes defining a respective buffer region in a respective angular range around a respective boundary line. Furthermore, the method includes determining whether an azimuth angle of a gravity acceleration vector component in (Continued)

the coordinate plane is kept in a respective azimuth interval corresponding to a current display mode of the image including two buffer regions respectively associated with two boundary lines of the respective azimuth interval.

20 Claims, 10 Drawing Sheets

(56) References Cited

U.S. PATENT DOCUMENTS

| | | |
|---|---|---|
| 2006/0033760 A1 | 2/2006 | Koh |
| 2013/0027337 A1 | 1/2013 | Chen |
| 2013/0219345 A1* | 8/2013 | Saukko ................ H04M 1/724 |
| | | 715/863 |
| 2014/0009387 A1* | 1/2014 | Hwang ..................... G06F 3/03 |
| | | 345/156 |
| 2014/0184504 A1* | 7/2014 | Yang ..................... G06F 1/1684 |
| | | 345/158 |
| 2016/0274768 A1 | 9/2016 | Tian et al. |
| 2018/0018946 A1* | 1/2018 | Park ....................... G06F 3/0346 |

FOREIGN PATENT DOCUMENTS

| | | |
|---|---|---|
| CN | 103002132 B | 9/2014 |
| CN | 104777998 A | 7/2015 |
| CN | 104820562 A | 8/2015 |
| CN | 107145269 A | 9/2017 |
| CN | 107168691 A | 9/2017 |
| JP | 2004219791 A | 8/2004 |

OTHER PUBLICATIONS

First Office Action in the Chinese Patent Application No. 201910107399.6 dated Dec. 3, 2019; English translation attached.

* cited by examiner

METHOD AND APPARATUS FOR CONTROLLING ROTATION OF DISPLAYED IMAGE, DISPLAY APPARATUS, AND COMPUTER-PROGRAM PRODUCT

CROSS-REFERENCE TO RELATED APPLICATION

This application is a national stage application under 35 U.S.C. § 371 of International Application No. PCT/CN2019/109938, filed Oct. 8, 2019, which claims priority to Chinese Patent Application No. 201910107399.6, filed Feb. 2, 2019. Each of the forgoing applications is herein incorporated by reference in its entirety for all purposes.

TECHNICAL FIELD

The present invention relates to display technology, more particularly, to a method and a sensing apparatus for controlling rotation of displayed image, a display apparatus, and a computer-program product.

BACKGROUND

In an electronic apparatus having a display screen, such as a smart phone, the image displayed in the display screen can be switched from a landscape display mode to a portrait display mode as the gravity acceleration vector changes relative to the display screen. However, display mode switching sometime becomes unnecessary, or improper switching due to incorrect response, or failure to obtain rotated image due to fast rotation of the electronic apparatus in space. Therefore, an improved method and apparatus for controlling rotation of displayed image are desired.

SUMMARY

In an aspect, the present disclosure provides a method for controlling rotation of an image displayed in a display screen. The method includes a step of establishing a coordinate system with an origin being set at a center of the display screen. The coordinate system includes a coordinate plane in parallel to an average plane associated with the display screen. Additionally, the method includes a step of dividing the coordinate plane to four azimuth intervals with boundary lines being all intersected at the origin of the coordinate system. The four azimuth intervals correspond respectively to four display modes of the image being displayed in four different orientations in the display screen. Furthermore, the method includes a step of defining a respective buffer region in a respective angular range around a respective one of four boundary lines. Moreover, the method includes a step of determining whether an azimuth angle of a gravity acceleration vector component in the coordinate plane during rotation of the display screen is kept in a respective azimuth interval corresponding to a display mode of the unage currently displayed including two buffer regions respectively associated with two boundary lines of the respective azimuth interval.

Optionally, upon a determination that the azimuth angle of the gravity acceleration vector component in the coordinate plane during rotation of the display screen is not kept in the respective azimuth interval corresponding to a display mode of the image currently displayed, the method further includes a step of determining an actual azimuth interval of the four azimuth intervals where the gravity acceleration vector component in the coordinate plane is actually located due to the rotation of the display screen. The method further includes a step of rotating the image in the display screen based on a display mode corresponding to the actual azimuth interval. Additionally, the method includes determining two buffer regions associated with two boundary lines of the actual azimuth interval in the coordinate plane.

Optionally, upon a determination that the azimuth angle of the gravity acceleration vector component in the coordinate plane during rotation of the display screen is kept in the respective azimuth interval corresponding to a display mode of the image currently displayed, the method further includes a step of prohibiting rotation of the image in the display screen.

Optionally, the coordinate plane includes a first axis and a second axis, both intersected at the origin.

Optionally, the coordinate plane is an orthogonal one with a first axis being perpendicular to a second axis.

Optionally, the display screen includes a rectangular shape, the first axis being m parallel to a length direction of the display screen and the second axis being in parallel to a width direction of the display screen.

Optionally, the coordinate plane includes a radial axis from the origin and an angular coordinate measured in the coordinate plane from the radial axis in a counterclockwise direction. The coordinate system includes a normal axis perpendicular to the coordinate plane from the origin.

Optionally, the coordinate system includes a third axis being normal to the coordinate plane from the origin.

Optionally, the method further includes a step of obtaining a value of a gravity acceleration vector component in the third axis and a step of determining whether the value is greater than a threshold value.

Optionally, upon a determination that the value is greater than a threshold value, the method further includes a step of setting one of the four azimuth intervals to be one corresponding to the display mode of the image currently displayed in the display screen according to a predetermined selection.

Optionally, upon a determination that the value is not greater than a threshold value, the method further includes a step of determining the respective azimuth interval where the gravity acceleration vector component in the coordinate plane is actually located to be one corresponding to the display mode currently displayed in the display screen.

Optionally, the step of dividing the coordinate plane to four azimuth intervals incudes a sub-step of setting four boundary lines to separate the coordinate plane and setting a respective azimuth angle corresponding to a respective boundary line measured in the coordinate plane from at least one axis in a counterclockwise direction, a sub-step of defining a first azimuth interval between a fourth boundary line and a first boundary line, a second azimuth interval between the first boundary line and a second boundary line, a third azimuth interval between the second boundary line and a third boundary line, and a fourth azimuth interval between the third boundary line and the fourth boundary line.

Optionally, the first boundary line is defined by a first azimuth angle of about 45 degrees, the second boundary line is defined by a second azimuth angle of about 135 degrees, the third boundary line is defined by a third azimuth angle of about 225 degrees, and the fourth boundary line is defined by a fourth azimuth angle of about 315 degrees.

Optionally, the step of defining a respective buffer region around a respective one of the four boundary lines includes a sub-step of defining a first preset angle measured in the coordinate plane from a respective boundary line in a counterclockwise direction and a second preset angle measured in the coordinate plane from the respective boundary line in a clockwise direction. The first preset angle is less than one half of an angular value associated with an azimuth interval having the respective boundary line and a first neighboring boundary fine in the counterclockwise direction and the second preset angle is less than one half of an angular value associated with an azimuth interval having the respective boundary line and a second neighboring boundary line in the clockwise direction.

Optionally, the step of rotating the usage includes redisplaying the unage currently displayed in an alternative display mode corresponding to the actual azimuth interval where the gravity acceleration vector component in the coordinate plane is located. The unage is displayed in the display screen in an orientation corresponding to the alternative display mode.

Optionally, the step of determining two buffet regions associated with two boundary lines of the actual azimuth interval in the coordinate plane includes a sub-step of determining a first angular range around a first one of the two boundary lines and a second angular range around a second one of the two boundary lines. The first angular range includes a first preset angle measured in the coordinate plane from the first one of the two boundary lines in a counterclockwise direction and a second preset angle measured in the coordinate plane from the first one of the two boundary lines in a clockwise direction. The second angular range includes a third preset angle measured in the coordinate plane from the second one of the two boundary lines in a counterclockwise direction and a fourth preset angle measured in the coordinate plane from the second one of the two boundary lines in a clockwise direction.

In another aspect, the present disclosure provides a sensing apparatus embedded in a display apparatus for controlling rotation of an image displayed in a display screen thereof. The sensing apparatus includes a memory configured to store pre-loaded programs containing one or more computer-executable instructions. The sensing apparatus further includes a gravity sensor configured to measure a gravity acceleration vector. Moreover, the sensing apparatus includes a processor coupled to the memory and the gravity sensor and configured to process the gravity acceleration vector and execute the one or more computer-executable instructions, including to establish a coordinate system with an origin being set at a center of the display screen, to divide the coordinate plane to four azimuth intervals with boundary lines being all intersected at the origin of the coordinate system, to define a respective buffer region in a respective angular range around a respective one of four boundary lines, and to determine whether an azimuth angle of a component of the gravity acceleration vector in the coordinate plane during rotation of the display screen is kept in a respective azimuth interval corresponding to a display mode of the unage currently displayed including two buffer regions respectively associated with two boundary lines of the respective azimuth interval. The coordinate system includes a coordinate plane in parallel to an average plane associated with the display screen. The four azimuth intervals correspond respectively to four display modes of the image being displayed in four different orientations in the display screen.

Optionally, upon a determination that the azimuth angle of the gravity acceleration vector component in the coordinate plane during rotation of the display screen is not kept in the respective azimuth interval corresponding to a display mode of the image currently displayed, the processor is configured to execute the one or more computer-executable instructions to determine an actual azimuth interval of the four azimuth intervals where the gravity acceleration vector component in the coordinate plane is actually located due to the rotation of the display screen, to rotate the image in the display screen based on a display mode corresponding to the actual azimuth interval; and to determine two buffer regions associated with two boundary lines of the actual azimuth interval in the coordinate plane.

Optionally, upon a determination that the azimuth angle of the gravity acceleration vector component in the coordinate plane during rotation of the display screen is kept in the respective azimuth interval corresponding to a display mode of the image currently displayed, the processes is configured to execute the one or more computer-executable instructions to prohibit rotation of the image in the display screen.

Optionally, the coordinate system is an orthogonal coordinate system having a first axis and a second axis laying in the coordinate plane perpendicularly intersected at the origin and a third axis perpendicular to the coordinate plane.

Optionally, the gravity sensor is configured to measure a value of a component of the gravity acceleration vector in the third axis and the processor is configured to determine whether the value is greater than a threshold value determine an actual azimuth interval based on an azimuth angle of a component of the gravity acceleration vector is actually located in the coordinate plane.

Optionally, upon a determination that the value is not greater than a threshold value, the processor is further configured to execute the one or more computer-executable instructions to determine an actual azimuth interval based on an azimuth angle of a component of the gravity acceleration vector is actually located in the coordinate plane.

Optionally, upon a determination that the value is greater than a threshold value, the processor is further configured to execute the one or more computer-executable instructions to determine one of the four azimuth intervals to be one corresponding to the image currently being displayed in a display mode based on a predetermined option stored in the memory.

Optionally, the processor is further other configured to execute the one or more computer-executable instructions to set four boundary lines to separate the coordinate plane, to set a respective azimuth angle corresponding to a respective boundary line measured in the coordinate plane from at least one axis in a counterclockwise direction, and to define a first azimuth interval between a fourth boundary lice and a first boundary line, a second azimuth interval between the first boundary line and a second boundary line, a third azimuth interval between the second boundary line and a third boundary line, and a fourth azimuth interval between the third boundary line and the fourth boundary line. Therefore, the coordinate plane is divided to four azimuth intervals.

Optionally, the first boundary line is defined by a first azimuth angle of about 45 degrees, the second boundary line is defined by a second azimuth angle of about 135 degrees, the third boundary line is defined by a third azimuth angle of about 225 degrees, and the fourth boundary line is defined by a fourth azimuth angle of about 315 degrees.

Optionally, the processor is further configured to execute the one or more computer-executable instructions to define a first preset angle measured in the coordinate plane from a respective boundary line in a counterclockwise direction and a second preset angle measured in the coordinate plane from the respective boundary line in a clockwise direction. Therefore, a respective buffer region is defined around a respective one of the four boundary lines. The first preset angle is less than one half of an angular value associated with an azimuth interval having the respective boundary line and a first neighboring boundary line in the counterclockwise direction. The second preset angle is less than one half of an angular value associated with an azimuth interval having live respective boundary line and a second neighboring boundary line in the clockwise direction.

Optionally, the processor is further configured to execute the one or more computer-executable instructions to redisplay the image currently displayed in an alternative display mode corresponding to the actual azimuth interval where the gravity acceleration vector component in the coordinate plane is located. The image is displayed in the display screen in an orientation corresponding to the alternative display mode. Therefore, the unage is rotated.

Optionally, the processor is further configured to execute the one or more computer-executable instructions to determine a first angular range around a first one of the two boundary lines and a second angular range around a second one of the two boundary lines. The first angular range includes a first preset angle measured in the coordinate plane from the first one of the two boundary lines in a counterclockwise direction and a second preset angle measured in the coordinate plane from the first one of the two boundary lines in a clockwise direction. The second angular range includes t third preset angle measured in the coordinate plane from the second one of the two boundary lines in a counterclockwise direction and a fourth preset angle measured in the coordinate plane from the second one of the two boundary lines in a clockwise direction.

In yet another aspect, the present disclosure provides a display apparatus including a display screen, a display driver configured to drive the display screen to display an image in at least one of four display modes, and a sensing apparatus described herein and configured to control rotation of the image displayed in the display screen from one display mode to another.

Optionally, the display apparatus comprises one selected from a smart phone, a tablet computer, and a digital picture screen.

In still another aspect, the present disclosure provides computer-program product including a non-transitory tangible computer readable medium having computer-readable instructions thereon. The computer-readable instructions are executable by a processor to cause the processor to perform a step of establishing a coordinate system with an origin being set at a center of a display screen. The coordinate system including a coordinate plane in parallel to an average plane associated with the display screen. The computer-readable instructions are executable by a processor to cause the processor to further perform a step of dividing the coordinate plane to four azimuth intervals with boundary lines being all intersected at the origin of the coordinate system. The four azimuth intervals correspond respectively to four display modes of an unage being displayed in four different orientations in the display screen. The computer-readable instructions are executable by a processor to cause the processor to additionally perform a rep of defining a respective buffer region in a respective angular range around a respective one of four boundary lines. The computer-readable instructions are executable by a processor to cause the processor to furthermore perform a step of determining whether an azimuth angle of a gravity acceleration vector component in the coordinate plane during rotation of the display screen is kept in a respective azimuth interval corresponding to a display mode of the image currently displayed including two buffer regions respectively associated with two boundary lines of the respective azimuth interval.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
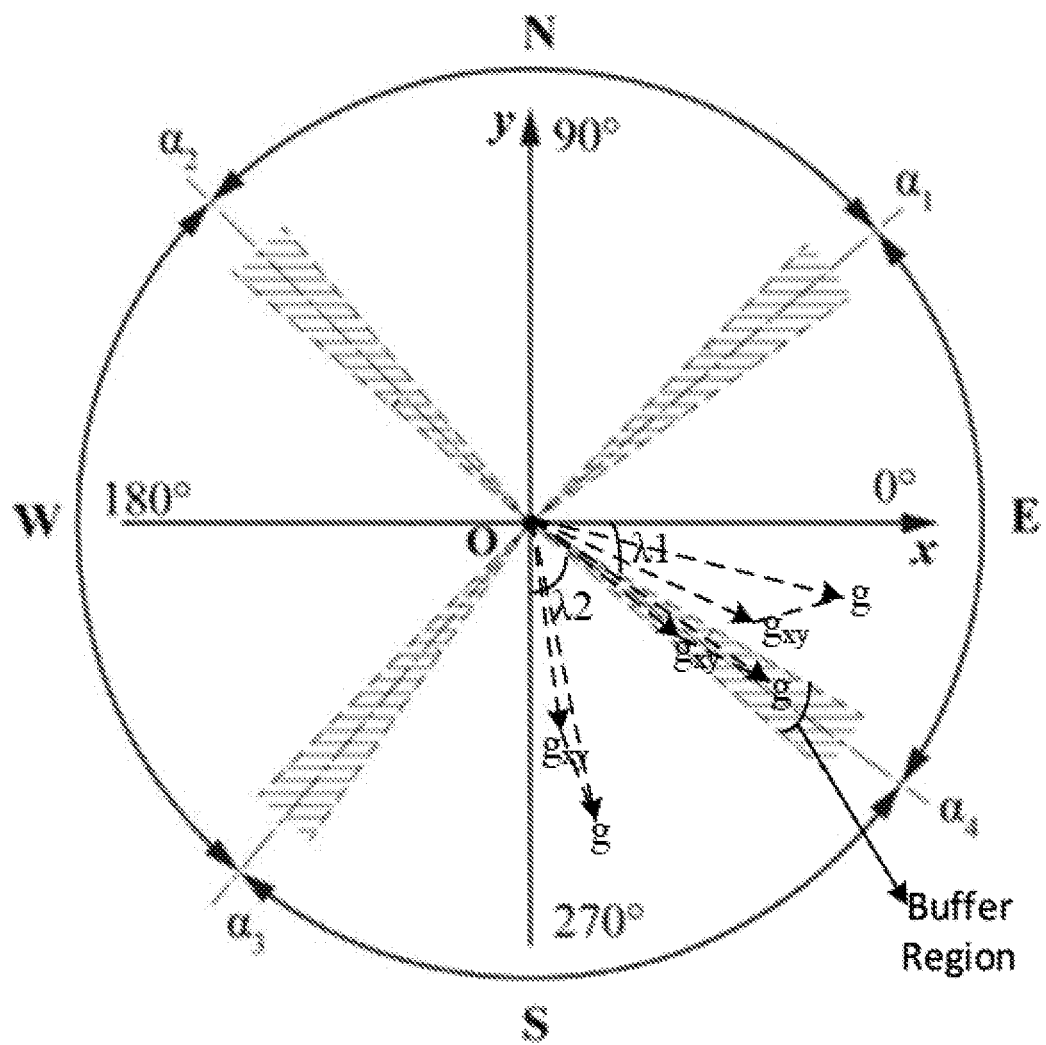
FIG. 1 is a schematic diagram of multiple switchable azimuth intervals including buffer regions defined in a coordinate system corresponding to multiple display modes according to an embodiment of the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In the description of the present invention, it is to be understood that the terms "origin", "center", "upper", "lower", "front", "back", "left", "right", "vertical", "horizontal", The orientation or positional relationship of the "top", "bottom", "made", "outside" and the like is based on the orientation or positional relationship shown in the drawings, and is merely for convenience of description of the present invention and a simplified description, rather than indicating or implying. The device or component referred to must have a particular orientation, is constructed and operated in a particular orientation and thus is not to be construed as landing the invention. In the description of the present invention the meaning of "a plurality" is two or more unless otherwise stated.

For an electronic apparatus having a display screen for displaying images, during rotation of the electronic apparatus the display screen orientation also changes from one azimuth interval to another azimuth interval in a coordinate system established based on a physical plane of the display screen. In order to avoid unnecessary display mode switching, a buffer region is added between two neighboring azimuth intervals so that the switching of display mode of the image displayed in the display screen will not be triggered if a gravity acceleration vector component in the physical plane of the display screen just falls into the buffer region. However, when the electronic apparatus changes its orientation suddenly to another buffer region that is not associated with the respective azimuth interval, the switching of display mode may be responded incorrectly.

Using a smart phone as an example of the electronic apparatus, an image displayed in a display screen of the smart phone can be switched among four different orientations. As shown in FIG. 1, setting a center point O of the display screen of the electronic apparatus as an origin to establish an orthogonal coordinate system. The coordinate system includes an x axis and a y axis perpendicularly intersected at the origin. In a plane made by the x axis and the y axis, an azimuth angle of a positive direction of the x axis is defined to be 0° and increases its value along a counterclockwise direction. The plane of the display screen is in the plane made by the x axis and the y axis and is divided into four azimuth intervals. An azimuth interval represents a radial section of the plane having a certain azimuth angular range. The four different azimuth intervals include a first azimuth interval (denoted by E), a second azimuth interval (denoted by N), a third azimuth interval (denoted by W), and a fourth azimuth interval (denoted by S). A respective one of the four azimuth intervals corresponds to a respective one of four display modes of the image being displayed in the display screen, using (for example) some control buttons as reference.

Figure 2:
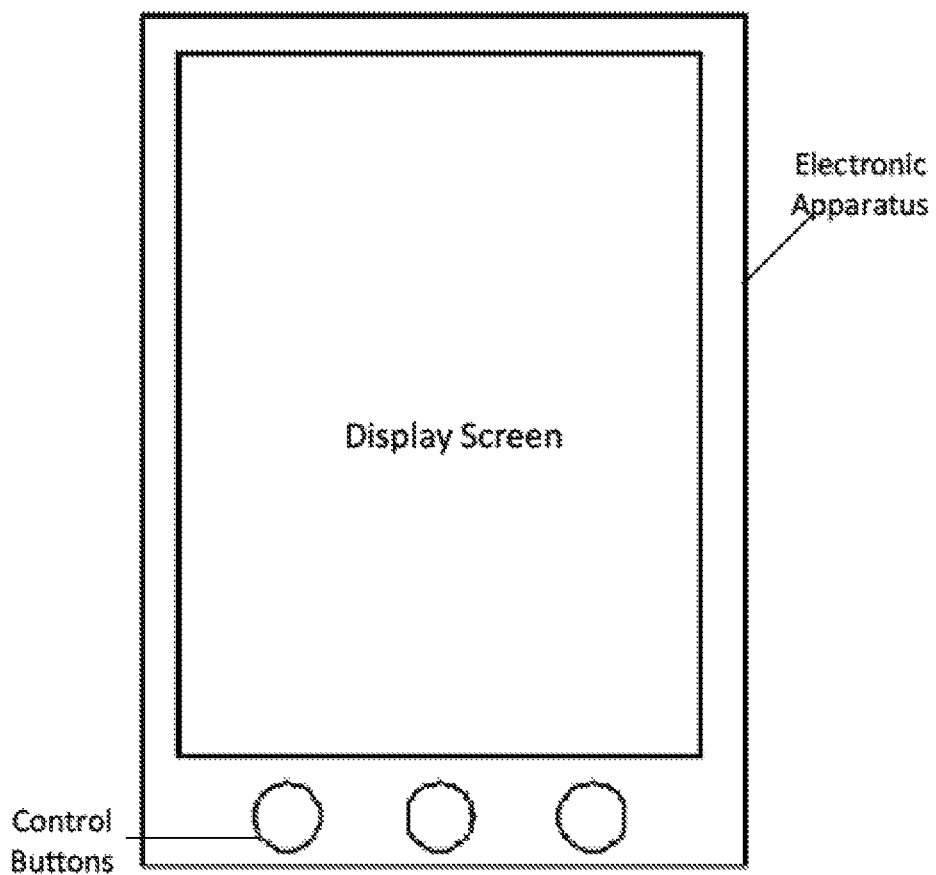
FIG. 2 is a schematic diagram of display modes in an electronic apparatus for displaying image in its display screen according to an embodiment of the present disclosure.
Figure 3:
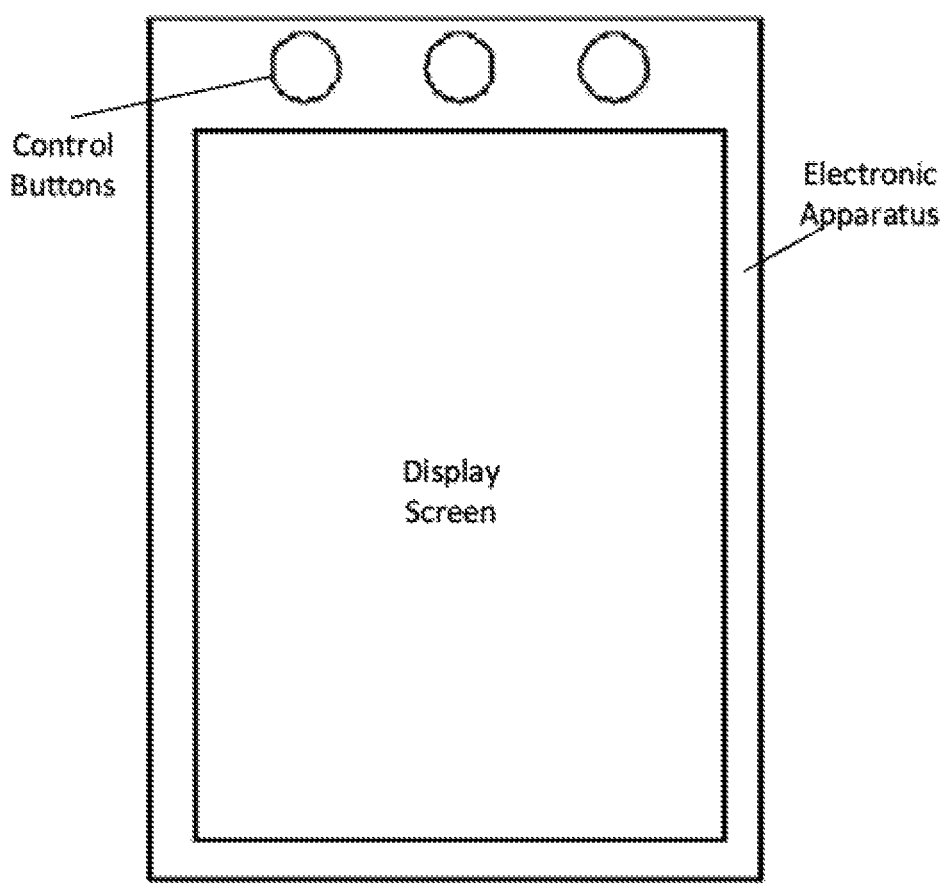
FIG. 3 is a schematic diagram of display modes in an electronic apparatus for displaying image in its display screen according to an embodiment of the present disclosure.
Figure 4:
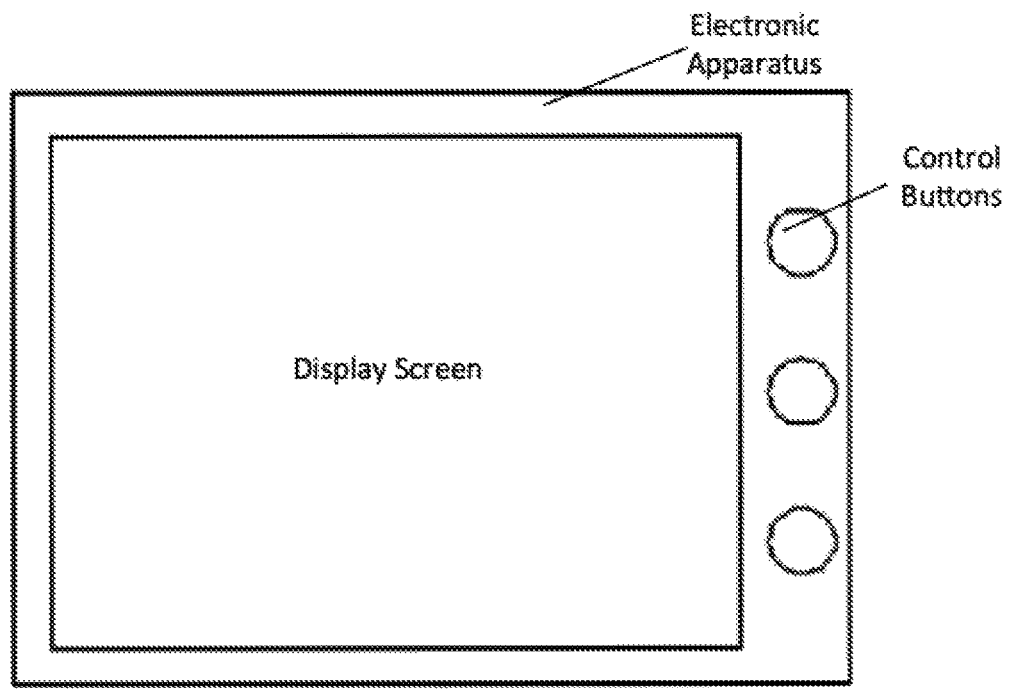
FIG. 4 is a schematic diagram of display modes in an electronic apparatus for displaying image in its display screen according to an embodiment of the present disclosure.
Figure 5:
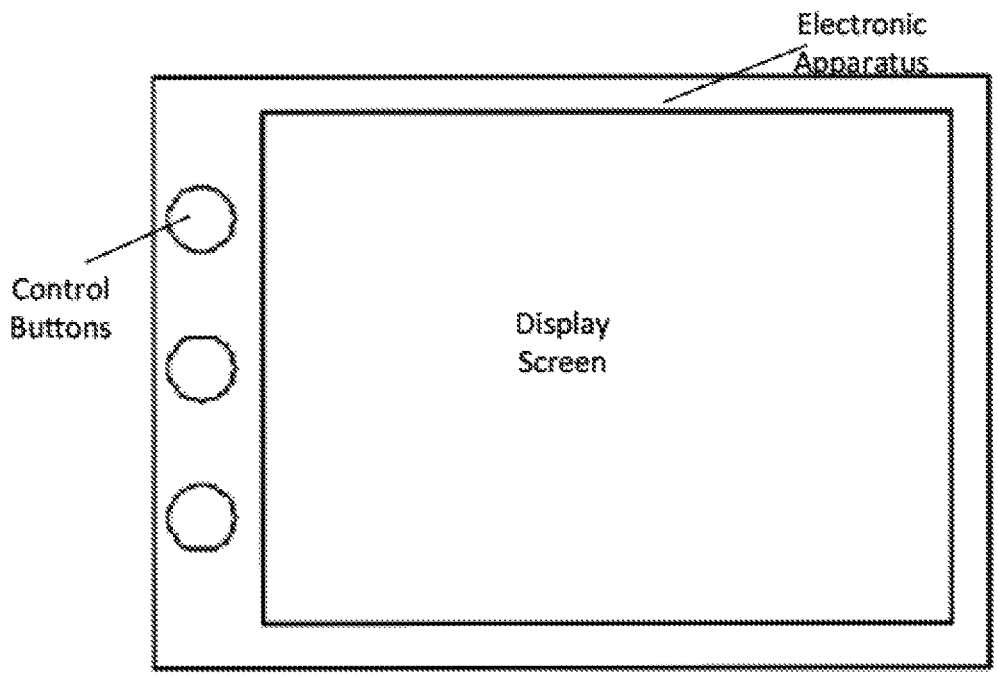
FIG. 5 is a schematic diagram of display modes in an electronic apparatus for displaying image in its display screen according to an embodiment of the present disclosure.

Referring to FIG. 2, using a smart phone as an example, the smart phone is substantially in a vertical orientation such that the image displayed is located above the control buttons. The display mode just shown (FIG. 2) is an Upward portrait display mode. Referring to FIG. 3, the smart phone is substantially in another vertical orientation such that the image displayed is located below the control buttons. The display mode (FIG. 3) is then a Downward portrait display mode. Referring to FIG. 4, the smart phone is substantially in a horizontal orientation such that the image displayed is located at left side of the control buttons. This display mode (FIG. 4) then is a Left landscape display mode. Further referring to FIG. 5, the smart phone is substantially in another horizontal orientation such that the unage displayed is located at right side of the control buttons. This display mode (FIG. 5) is a Right landscape display mode.

Referring to FIG. 1 through FIG. 5, the four display modes respectively correspond to the four azimuth intervals. For example, if a gravity sensor detects a component $g_{xy}$ of a gravity acceleration vector g in the plane made by a first axis x and a second axis y and finds that the $g_{xy}$ falls into the second azimuth interval N, the display mode of the image is the Downward portrait display mode. If the $g_{xy}$ falls into the third azimuth interval W, the display mode of the image is the Left landscape display mode. If the $g_{xy}$ falls into the fourth azimuth interval S, the display mode of the image is the Upward portrait display mode.

Referring to FIG. 1, a buffer region is set at a boundary region between any two neighboring azimuth intervals. A gravity acceleration vector g associated with the electronic apparatus can be measured by a gravity sensor. Based on the measurement of the gravity acceleration vector g, it can be set that the display mode of the image is not switched until a component $g_{xy}$ of the gravity acceleration vector g in the plane of the display screen is substantially near a particular azimuth direction. For example, in FIG. 1, when an angle λ1 between the and the positive direction of the axis x is smaller than 30° and the $g_{xy}$ is in the first azimuth interval E, the display mode of the image displayed in the display screen thus is the Right landscape display mode. In another example, when an angle λ2 between the $g_{xy}$ and the negative direction of axis y is smaller than 30° and the now is in the fourth azimuth interval S, the image will be rotated and displayed in the Upward portrait display mode corresponding to the fourth azimuth interval S. In yet another example, when angles between the $g_{xy}$ and the positive direction of axis x and between the $g_{xy}$ and the negative direction of axis y are all not smaller than 30°, the displayed unage will be kept in its current display mode (Right landscape display mode) without rotation. Based on above analysis, the region with the $g_{xy}$ having an angle greater than 30° from the negative direction of axis y and another angle greater than 30° from the positive direction of axis x can be defined as a buffer region.

In applications, measurement of the gravity acceleration vector by the gravity sensor and reading of the gravity sensor data by a main controller are usually done via data sampling at discrete tune points. If the electronic apparatus rotates fast enough, the component $g_{xy}$ of the gravity acceleration vector g in the plane of the display screen can be changed from any one angle to another random angle within two sampling time points. In this case, the concept of buffer region defined above may keep the displayed image without rotation even if the $g_{xy}$ has been found in another azimuth interval which corresponds to another display mode being actually more reasonable (to viewer).

Figure 6:
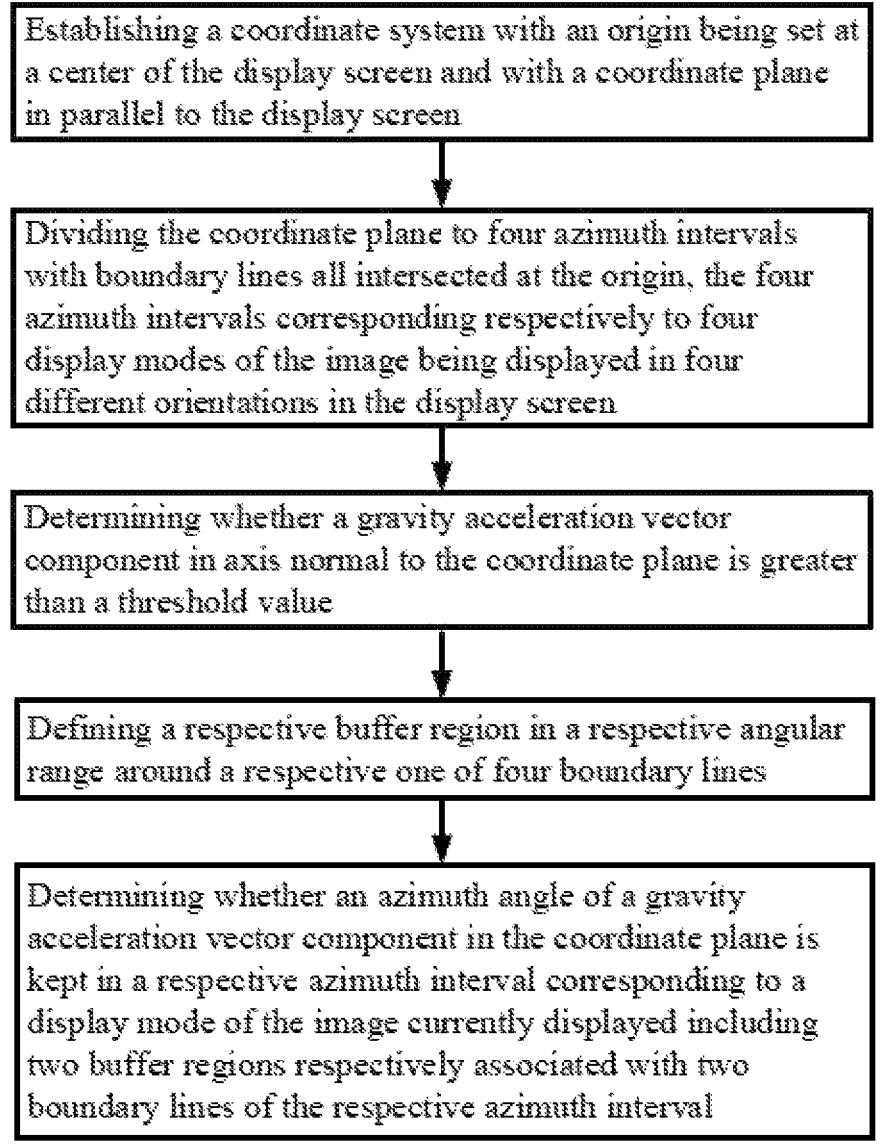
FIG. 6 is a flow chart illustrating a method for controlling rotation of displayed image in a display screen according to an embodiment of the present disclosure.
Figure 7:
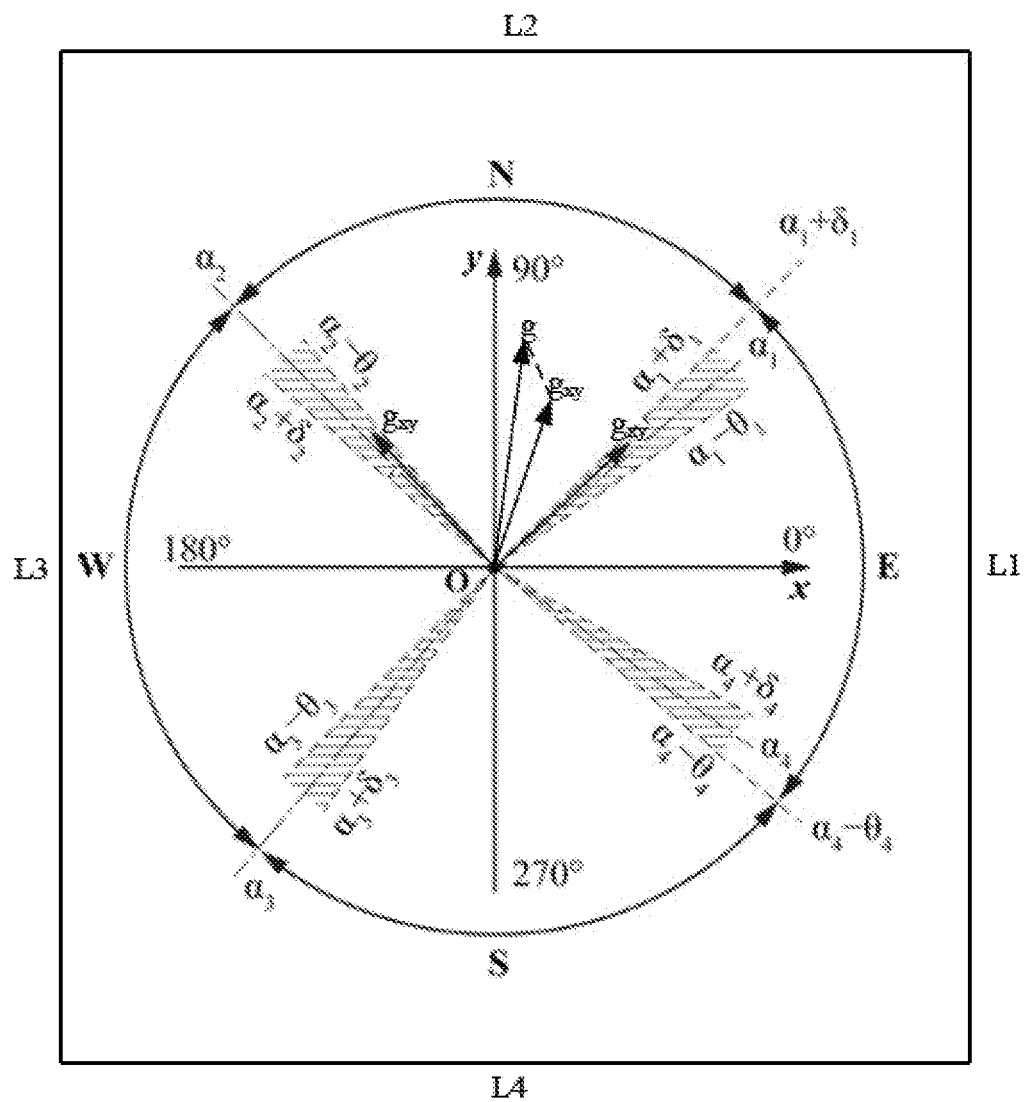
FIG. 7 is a schematic diagram illustrating an azimuth angle of a gravity acceleration vector component in the coordinate plane of a first axis and a second axis fell into a second azimuth interval including two buffer regions around its two boundary lines according to an embodiment of the present disclosure.
Figure 8:
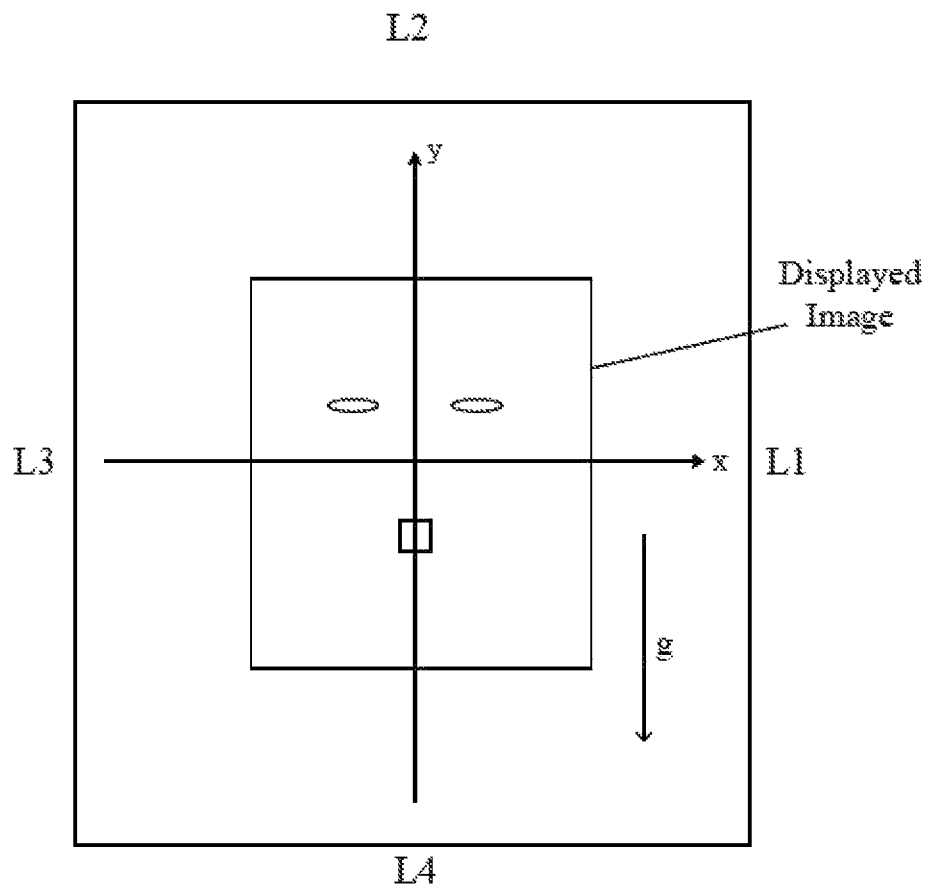
FIG. 8 is a schematic diagram illustrating an image displayed in a portrait display mode corresponding to the second azimuth interval shown in FIG. 7 according to an embodiment of the present disclosure.

Accordingly, the present disclosure provides, inter alia, a method for controlling rotation of an image displayed in a display screen upon sensing orientation change of the display screen, a sensing apparatus having the same, and a display apparatus that substantially obviate one or more of the problems due to limitations and disadvantages of the related art. In one aspect, the present disclosure provides, as illustrated in FIG. 6 and FIG. 7, a method for controlling rotation of an image displayed in a display screen. FIG. 6 shows a flow chart illustrates a method for controlling rotation of displayed unage in a display screen according, to an embodiment of the present disclosure. FIG. 7 shows a schematic diagram illustrating an azimuth angle of a gravity acceleration vector component $g_{xy}$ in the coordinate plane of a first axis x and a second axis y fell into a second azimuth interval including two buffer regions around its two boundary lines according to an embodiment of the present disclosure.

Referring to FIG. 6, the method includes a step of setting a center point of the display screen as an origin O to establish a coordinate system including a first axis x, a second axis y being laid in a coordinate plane. Optionally, the coordinate plane is the physical plane of the display screen. Optionally, the coordinate plane is an average plane across the area of the display screen (e.g., the display screen may be a curved screen). Optionally, the coordinate plane is at least in parallel to an average plane associated with the display screen. Optionally, the coordinate plane is made by one axis from the origin O and an angular coordinate measured from the axis in a counterclockwise direction. Optionally, the coordinate system includes a third axis z normal to the coordinate plane pointing above from the origin O.

The method further includes a step of dividing the coordinate plane to four azimuth intervals. Any two neighboring azimuth intervals has a boundary line radial direction, giving each azimuth interval a respective angular range. All these boundary lines are intersected at the origin O of the coordinate system. Optionally, the angular range of a respective azimuth interval can be same or different. A respective one of the four azimuth intervals corresponds respectively to a respective one of the four display modes of the image being displayed in four different orientations is the display screen. Optionally, the four display modes include Upward portrait display mode. Downward portrait display mode. Left landscape display mode, and Right landscape display mode.

Optionally, the first axis x and the second axis y are perpendicular to each other. Optionally, they can be intersected non-vertically. In the embodiment shown in FIG. 7, the coordinate system is an orthogonal coordinate system with the first axis x and the second axis y being vertically intersected at the origin O. The positive direction of axis x is set with an azimuth angle of 0°. The azimuth angle increases along a counterclockwise direction, giving an azimuth angle of the positive direction of axis y to be 90°, an azimuth angle of the negative direction of axis x to be 180°, an azimuth angle of the negative direction of axis y to be 270°.

Referring to FIG. 7, the four azimuth intervals that are divided from the coordinate plane include a first azimuth interval E, a second azimuth interval N, a third azimuth interval W, and a fourth azimuth interval S. In the embodiment, a boundary line between the first azimuth interval E and the second azimuth interval N is denoted as α1, which also corresponds to its azimuth angle. A boundary line between the second azimuth interval N and the third azimuth interval W is denoted as α2, which also corresponds to its azimuth angle. A boundary line between the third azimuth interval W and the fourth azimuth interval S is denoted as α3, which also corresponds to its azimuth angle. A boundary line between the fourth azimuth interval S and the first azimuth interval E is denoted as α4, which also corresponds to its azimuth angle. In the embodiment, the first azimuth interval E corresponds to an angular range tram the azimuth angle of α4 to the azimuth angle of α1. The second azimuth interval N corresponds to an angular range from the azimuth angle of α1 to the azimuth angle of α2. The third interval W corresponds to an angular range from the azimuth angle of α2 to the azimuth angle of α3. The fourth interval S corresponds to an angular range from the azimuth angle of α3 to the azimuth angle of α4. Optionally, each of the angular ranges can be an open interval or a close interval or a left-open right-close interval or a left-close right-open interval, depending on applications.

Optionally, for any electronic apparatus with a display screen, the display mode associated with the image displayed in the display screen can be defined based on its relationship with certain control buttons (or other hardware features) on the display screen. Using a smart phone as an example shown in FIG. 7 and FIG. 9, the four display modes can be defined by reference to the control buttons at one short side of the display screen thereof. As shown in FIGS. 2 through 5, the four display modes are respectively defined as Upward portrait display mode. Downward portrait display mode. Left landscape display mode, and Right landscape display mode. The four display modes respective correspond to the four azimuth intervals defined in FIG. 6. Whenever, the gravity acceleration vector component $g_{xy}$ is found in a respective one azimuth interval, the image displayed in the display screen will be displayed in the respective one display mode corresponding to the respective one azimuth interval.

Figure 9:
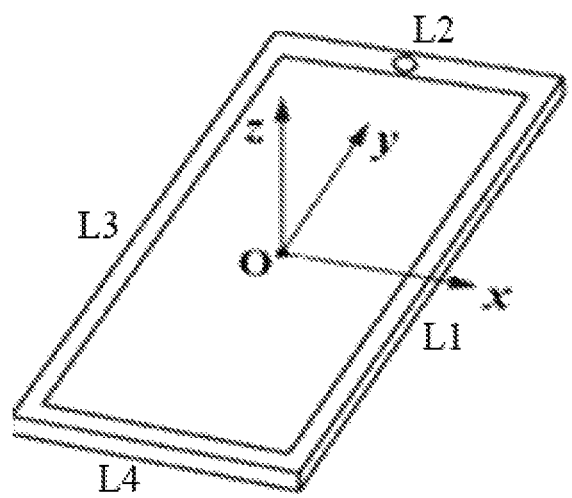
FIG. 9 is a schematic diagram illustrating a normal line of the display screen served as a third axis perpendicular to the coordinate plane according to an embodiment of the present disclosure.

Referring to FIG. 7 and FIG. 9, the display screen of the smart phone (or other electronic apparatus) as shown has a rectangular shape with a center point O and four edges denoted as L1, L2, L3, L4, respectively. When the image is displayed in a Right landscape display mode, the unage displayed in the display screen with a bottom edge in parallel to the edge L1 which is pointed by the positive direction of axis x. When the linage is displayed in a Downward portrait display mode, the image displayed in the display screen with a bottom edge in parallel to the edge L2 which is pointed by the positive direction of axis y. When the image is displayed in a Left landscape display mode, the image displayed in the display screen with a bottom edge in parallel to the edge L3 which is pointed by the negative direction of axis x. When the linage is displayed in a Upward portrait display mode, the image displayed in the display screen with a bottom edge in parallel to the edge L4 which is pointed by the negative direction of axis y.

Referring to FIG. 6 again, the method for controlling rotation of displayed image further includes a step of determining whether a gravity acceleration vector component $g_z$ in an axis normal to the coordinate plane is greater than a threshold value. Optionally, the step includes obtaining the gravity acceleration vector g. The step of obtaining the gravity acceleration vector g includes using a gravity sensor embedded in the electronic apparatus having the display screen. Optionally, the step of obtaining the gravity acceleration vector g includes sampling data of the gravity acceleration vector g at discrete time points. The data of the gravity acceleration vector g includes values of multiple component of the vector g including a component in the coordinate plane and a component $g_z$ in an axis normal to the coordinate plane. In the coordinate system, the axis normal to the coordinate plane made by the first axis x and the second axis y is a third axis z, which has a positive direction pointing upward of the display screen. When the gravity acceleration vector component $g_z$ in the third axis z, i.e., along its negative direction, is greater than the threshold value, the display screen can be considered to be primarily in a horizontal plane. The image displayed in the display screen at this sampling tune point (of the gravity acceleration vector) can be set to any one of the four display modes. For example the display screen can be preset to always display the image in the Right landscape display mode in this situation.

Referring to FIG. 6, the method additionally includes a step of defining a respective buffer region in a respective angular range around a respective one of four boundary lines. Optionally, the step includes determining at least two buffer regions of respective two boundary lines of the respective azimuth interval corresponding to the display mode of the image currently displayed in the display screen. In the embodiment, referring to FIG. 7, if the azimuth interval corresponding to the display mode of the currently displayed unage is the first azimuth interval E, then the two buffer regions can be determined as following. Based on the angular range of the first azimuth interval E and the angular ranges of two neighboring azimuth intervals, i.e., the second azimuth interval N with a boundary line α1 and the fourth azimuth interval S with a boundary line α4, the buffer region around the boundary line α1 can be defined by defining a first preset angle 91 measured in the coordinate plane from the boundary line α1 in a counterclockwise direction towards the second azimuth interval N and a second preset angle δ1 measured in the coordinate plane from the respective boundary line α1 in a clockwise direction towards the fourth azimuth interval S. The buffer region thus has an angular range including θ1 and δ1. Similarly another buffer region around the boundary line α4 includes an angular range of θ4 and δ4, where θ4 is a preset angle measured from the boundary line α4 towards the second azimuth interval N along a counterclockwise direction, and δ4 is a preset angle measured from the boundary line θ4 towards the fourth azimuth interval S along a clockwise direction. Optionally. θ1<α1, δ1<90°−α1, θ4<α4−270°, δ4<360°−α4. Optionally, the two buffer regions around two boundary lines of the first azimuth interval E can be denoted as two angular intervals, which can be open interval, close interval, left-close right-open interval, or left-open right-close interval.

Using azimuth angles to define the buffer region, the two buffer regions around two boundary lines of the first azimuth interval E can be denoted as [α1−θ1, α1+δ1) and [α4−4, α4+δ4), respectively.

Similar, if the azimuth interval corresponding to the display mode of the currently displayed image is the second azimuth interval N, then the two buffet regions can be defined using azimuth angles of corresponding boundary lines and relative rotation angles around the respective boundary line. In particular, the two buffer regions around two boundary lines of the second azimuth interval N can be denoted as [α1−θ1, α1+δ1) and [α2−θ2, α2+δ2), respectively.

If the azimuth interval corresponding to the display mode of the currently displayed image is the third azimuth interval W, then the two buffer regions can be defined using azimuth angles of corresponding boundary lines and relative rotation angles around the respective boundary line. In particular, the two buffer regions around two boundary lines of the third azimuth interval W can be denoted as [α2−θ2, α2+δ2) and [α3−θ3, α3+δ3), respectively.

If the azimuth interval corresponding to the display mode of the currently displayed image is the fourth azimuth interval S, then the two buffer regions can be defined us mg azimuth angles of corresponding boundary lines and relative rotation angles around the respective boundary line. In particular, the two buffer regions around two boundary lines of the fourth azimuth interval S can be denoted as [α3−θ3, α3+3) and [α4−θ4, α4+δ4), respectively.

Referring to FIG. 6 again, the method for controlling rotation of displayed image further includes a step of determining whether an azimuth angle corresponding to a gravity acceleration vector component $g_{xy}$ in the coordinate plane during rotation of the display screen is kept in a respective azimuth interval corresponding to a display mode of the image currently displayed including two buffer regions respectively associated with two boundary lines of the respective azimuth interval. The gravity acceleration vector component $g_{xy}$ is still a vector within the coordinate plane which is a vertical projection of the gravity acceleration vector g measured by a gravity sensor during rotation of the electronic apparatus having the display screen. The gravity acceleration vector component $g_{xy}$ has an azimuth angle relative to the positive direction of the first axis x. Based on the azimuth angle of the $g_{xy}$, a respective azimuth interval that the $g_{xy}$ falls into in the coordinate plane due to rotation of the display screen can be determined.

Figure 10:
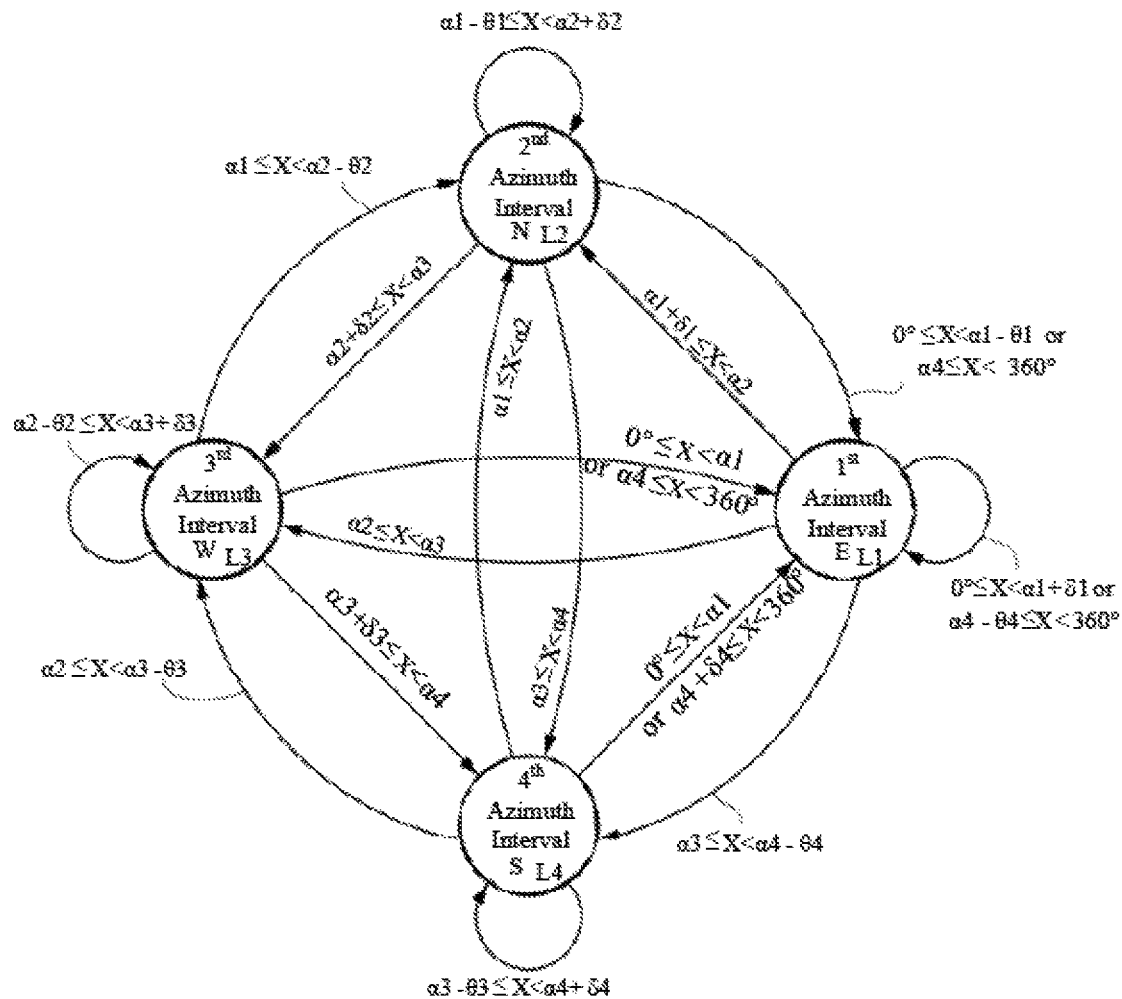
FIG. 10 is a schematic diagram illustrating multiple options of display mode switching for unage displayed in a display screen of an electronic apparatus during rotation according to some embodiments of the present disclosure.

Referring to FIG. 7 and FIG. 10, if the azimuth angle X corresponding to the $g_{xy}$ is located in the angular range of the second azimuth interval N, i.e., α1≤X≤α2, then the $g_{xy}$ falls into the second azimuth interval N. Further referring to FIG. 7, if the $g_{xy}$ falls into one of two buffer regions of the second azimuth interval N, α1−θ1≤X<α1+δ1, or α2−θ2≤X<α2+δ2, the unage will be displayed still at the current display mode without rotation. In other words, the azimuth interval corresponding to the current display mode remains to be the second azimuth interval N.

Alternatively, if the $g_{xy}$ does fall into those buffer regions, the method includes a step of determining an actual azimuth interval of the four azimuth intervals where the gravity acceleration vector component $g_{xy}$ in the coordinate plane is actually located due to the rotation of the display screen based on the azimuth angle X corresponding to the $g_{xy}$. Then, the step further includes controlling rotation of the image displayed in the current display mode in the display screen to an alternatively displayed image in an alternative display mode corresponding to the actual azimuth interval just determined due to rotation of the display screen.

Figure 11:
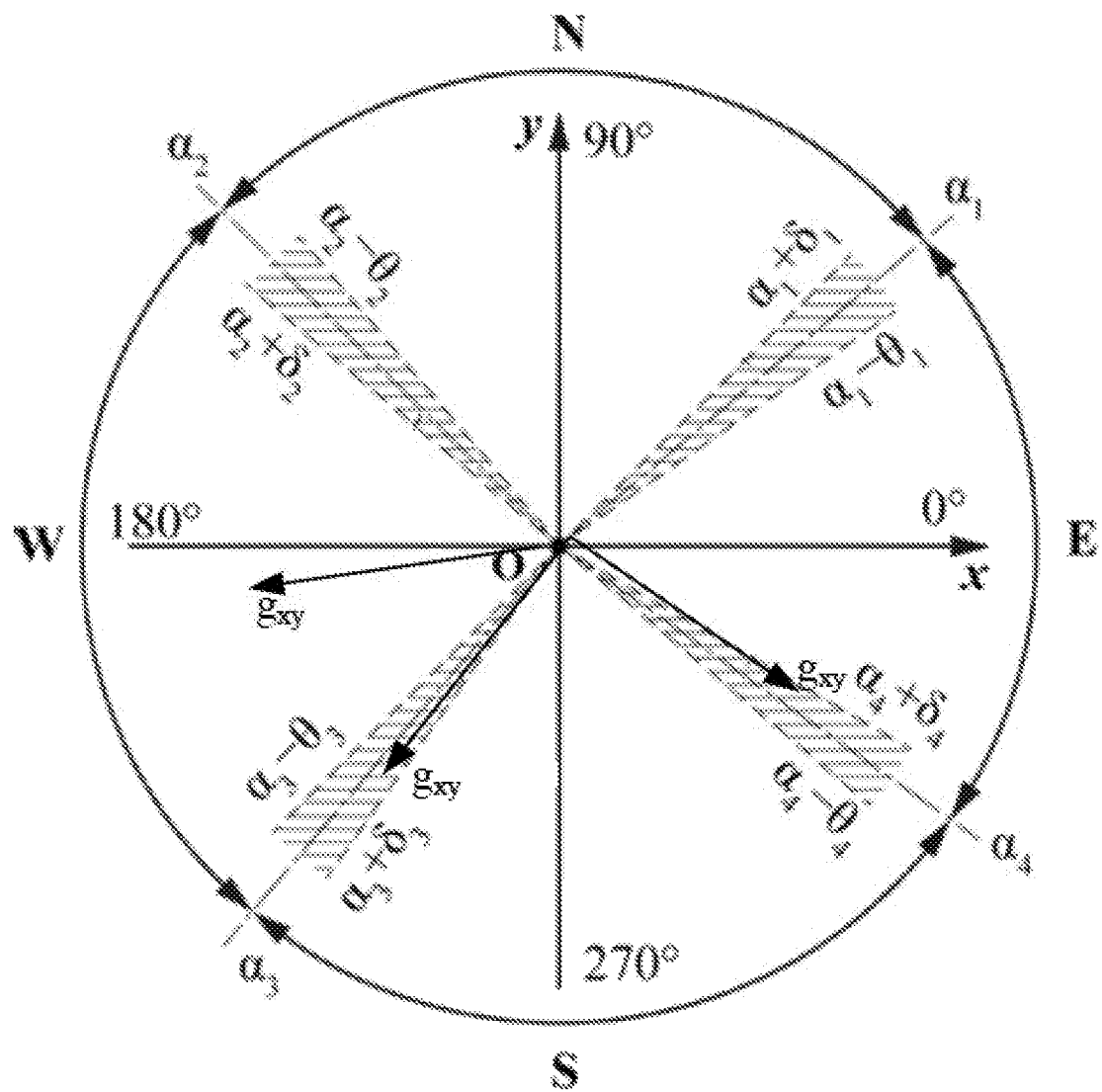
FIG. 11 is a schematic diagram illustrating an azimuth angle of a gravity acceleration vector component in the coordinate plane of a first axis and a second axis fell outside the second azimuth interval including two buffer regions around its two boundary lines according to an embodiment of the present disclosure.

In an example, if the $g_{xy}$ does not fall into the two buffer regions around two boundary lines of the second azimuth interval N, referring to FIG. 10 and FIG. 11, the azimuth angle X corresponding to the $g_{xy}$ is in the angular range of the third azimuth interval W, i.e., α2+δ2≤X<α3. Then, the $g_{xy}$ can be determined to fall into the third azimuth interval W outside one nearest buffer region relative to the second azimuth interval N and without caring about being in another buffer region (which is not nearest to the second azimuth interval N and now deactivated) and the image will be controlled to rotate and displayed in the display mode corresponding to the third azimuth interval W. Optionally, the image displayed under this display mode has a bottom edge in parallel to the edge L3 which is pointed by a negative direction of axis x.

In another example, if the azimuth angle X corresponding to the $g_{xy}$ is in the angular range, of the fourth azimuth interval S, i.e., α3≤X<α4, the $g_{xy}$ can be determined to fall into the fourth azimuth interval S without caring about whether it falls in the respective buffer regions (both are not nearest buffer regions relative to the second azimuth interval N and now are deactivated). Then, the step includes controlling rotation of the image to be displayed in a display mode corresponding to the fourth azimuth interval S. The unage displayed under this display mode has a bottom edge in parallel to the edge L4 which is pointed by a negative direction of axis y.

In yet another example, if the azimuth angle X corresponding to the $g_{xy}$ is in the angular range of the first azimuth interval E, i.e., 0°≤X<α1θ1, or α4≤X<360°, the $g_{xy}$ can be determined to fall into the first azimuth interval E beyond one nearest buffer region relative to the second azimuth interval N and without caring about falling into another buffer region (which is not nearest to the second azimuth interval N and now is deactivated). Then, the step includes controlling rotation of the image to be displayed in a display mode corresponding to the first azimuth interval E. The image displayed under this display mode has a bottom edge in parallel to the edge L1 which is pointed by a positive direction of axis x.

After the rotation of the displayed image, the method further includes a step of determining two buffer regions associated with two boundary lines of the actual azimuth interval in the coordinate plane. This sets a basis for controlling rotation of the displayed image next tune.

In general, the method for controlling rotation of displayed image is executed by determining the respective azimuth interval corresponding to current display mode including two buffer regions thereof based on the azimuth angle corresponding to the gravity acceleration vector component $g_{xy}$ actually in the coordinate plane due to rotation of the display screen. It does not need to determine if the $g_{xy}$ falls into other buffer regions that are not nearest to the respective azimuth interval. In other words, if the $g_{xy}$ still falls in the current azimuth interval including two nearest buffer regions due to a minor rotation of the display screen, the rotation of the displayed image is prohibited if the $g_{xy}$ falls into a new azimuth interval beyond any nearest buffer region to the current azimuth interval due to a more significant rotation of the display screen, the rotation of the displayed image is triggered, and the image will be displayed in a new display mode that corresponds to the new azimuth interval.

Figure 12:
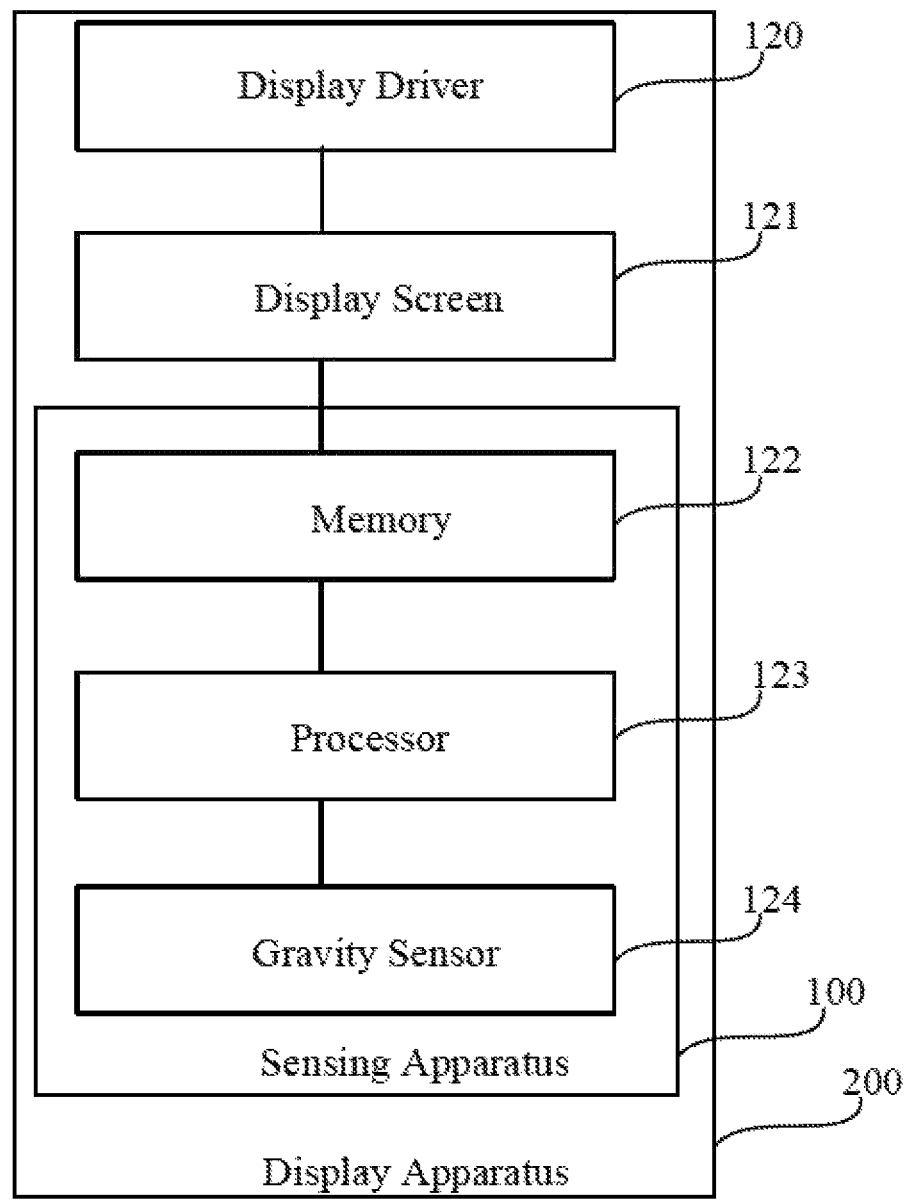
FIG. 12 is a block diagram of a display apparatus comprising a sensing apparatus for controlling rotation of displayed unage in a display screen thereof according to an embodiment of the present disclosure.

In another aspect, the present disclosure provides a sensing apparatus embedded in a display apparatus having a display screen. Optionally, as shown in FIG. 12, the sensing apparatus 100 includes at least a memory 122 configured to store pre-loaded programs containing one or mote computer-executable instructions. The sensing apparatus 100 further includes a gravity sensor 124 configured to measure a gravity acceleration vector. Optionally, the gravity sensor is configured to measure the gravity acceleration vector at discrete sampling points and to deduce respective components projected to an axis or to a plane. Additionally, the sensing apparatus 100 includes a processor 123 coupled to the memory 122 and the gravity sensor 124 and configured to process the gravity acceleration vector and execute the one or more computer-executable instructions.

Optionally, the processor 123 executes a computer-executable instruction to establish a coordinate system with an origin being set at a center of the display screen. Here the coordinate system includes a coordinate plane in parallel to an average plane associated with the display screen. The coordinate plane is made by a first axis and a second axis intersected from an origin. Optionally, the coordinate plane is made by an axis and an angular coordinate measured from the axis in a counterclockwise direction. Optionally, the coordinate system also includes an axis normal to the coordinate plane.

Optionally, the processor 123 executes a computer-executable instruction to divide the coordinate plane to four azimuth intervals with boundary lines being all intersected at the origin of the coordinate system. The four azimuth intervals correspond respectively to four display modes of the image being displayed in four different orientations in the display screen. Optionally, the processor 123 executes a computer-executable instruction to define a respective buffer region in a respective angular range around a respective one of four boundary lines.

Optionally, the processor 123 executes a computer-executable instruction to determine whether an azimuth angle of a component of the gravity acceleration vector in the coordinate plane during rotation of the display screen is kept in a respective azimuth interval corresponding to a display mode of the unage currently displayed including two buffer regions respectively associated with two boundary lines of the respective azimuth interval. Upon a determination that the azimuth angle of the gravity acceleration vector component in the coordinate plane during rotation of the display screen is not kept in the respective azimuth interval corresponding to a display mode of the unage currently displayed, the processor 123 is configured to execute the one or more computer-executable instructions to determine an actual azimuth interval of the four azimuth intervals where the gravity acceleration vector component in the coordinate plane is actually located due to the rotation of the display screen, to rotate the image in the display screen based on a display mode corresponding to the actual azimuth interval, and to determine two buffer regions associated with two boundary lines of the actual azimuth interval in the coordinate plane. Upon a determination that the azimuth angle of the gravity acceleration vector component in the coordinate plane during rotation of the display screen is kept in the respective azimuth interval corresponding to a display mode of the image currently displayed, the processor 123 is configured to execute the one or more computer-executable instructions to prohibit rotation of the image in the display screen.

In some embodiments, the coordinate system is an orthogonal coordinate system having a first axis and a second axis laying in the coordinate plane perpendicularly intersected at the origin and a third axis perpendicular to the coordinate plane.

In some embodiments, the processor 123 is configured to determine whether the value of the gravity acceleration vector component in the third axis is greater than a threshold value. Optionally, upon a determination that the value of the gravity acceleration vector component in the third axis is not greater than a threshold value, the processor 123 is further configured to execute the one or more computer-executable instructions to determine an actual azimuth interval based on an azimuth angle of a component of the gravity acceleration vector is actually located in the coordinate plane. Optionally, upon a determination that the value of the gravity acceleration vector component in the third axis is greater than a threshold value, the processor 123 is further configured to execute the one or more computer-executable instructions to determine one of the four azimuth intervals to be one corresponding to the image currently being displayed in a display mode based on a predetermined option stored in the memory.

In some embodiments, the processes' 123 is configured to execute the one or more computer-executable instructions to set four boundary lines to separate the coordinate plane; set a respective azimuth angle corresponding to a respective boundary line measured in the coordinate plane from at least one axis in a counterclockwise direction; define a first azimuth interval between a fourth boundary line and a first boundary line, a second azimuth interval between the first boundary line and a second boundary line, a third azimuth interval between the second boundary line and a third boundary line, and a fourth azimuth interval between the third boundary line and the fourth boundary line. Optionally, the first boundary line is defined by a first azimuth angle of about 45 degrees, the second boundary line is defined by a second azimuth angle of about 135 degrees, the third boundary line is defined by a third azimuth angle of about 225 degrees, and the fourth boundary line is defined by a fourth azimuth angle of about 315 degrees.

In some embodiments, the processor 123 is further configured to execute the one or more computer-executable instructions to define a first preset angle measured in the coordinate plane from a respective boundary line in a counterclockwise direction and a second preset angle measured in the coordinate plane from the respective boundary line in a clockwise direction, thereby defining a respective buffer region around a respective one of the four boundary lines. Optionally, the first preset angle is less than one half of an angular value associated with an azimuth interval having the respective boundary line and a first neighboring boundary line in the counterclockwise direction. Optionally, the second preset angle is less than one half of an angular value associated with an azimuth interval having the respective boundary line and a second neighboring boundary line in the clockwise direction.

In some embodiments, the processor 123 is further configured to execute the one or more computer-executable instructions to redisplay the image currently displayed in an alternative display mode corresponding to the actual azimuth interval where the gravity acceleration vector component in the coordinate plane is located. The image is displayed in the display screen in an orientation corresponding to the alternative display mode. Therefore, the processor 123 is further configured to execute the one or more computer-executable instructions to rotating the image.

In some embodiments, the processor 123 is further configured to execute the one or more computer-executable instructions to determine a first angular range around a first one of the two boundary lines and a second angular range around a second one of the two boundary lines. Optionally, the first angular range includes a first preset angle measured in the coordinate plane from the first one of the two boundary lines in a counterclockwise direction and a second preset angle measured in the coordinate plane from the first one of the two boundary lines in a clockwise direction. Optionally, the second angular range includes a third preset angle measured in the coordinate plane from the second one of the two boundary lines in a counterclockwise direction and a fourth preset angle measured in the coordinate plane from the second one of the two boundary lines in a clockwise direction.

In yet another aspect, referring to FIG. 12 again, the present disclosure provides a display apparatus 100 including a display driver 120 and a display screen 121. The display driver 120 is configured to drive the display screen 121 to display an image in at least one of four display modes. The display apparatus 100 also includes a sensing apparatus 200 embedded therein including a memory 122, a gravity sensor 124, and a processor 123. The sensing apparatus 200 is configured, and as described herein, to control rotation of the image displayed in the display screen 121 from one display mode to another upon determination of an azimuth interval including two nearest buffer regions that a gravity acceleration vector component falls into in the coordinate plane. Optionally, the display apparatus 100 includes one selected from a smart phone, a tablet computer and a digital picture screen, or any electronic apparatus having a display screen or display panel.

Examples of appropriate display apparatuses include, but are not limited to, an electronic paper, a mobile phone, a tablet computer, a television, a monitor, a notebook computer, a digital album, a GPS, etc. Optionally, the display apparatus further includes one or more integrated circuits connected to the display panel.

In still another aspect the present disclosure provides a computer-program product including a non-transitory tangible computer-readable medium having computer-readable instructions thereon. The computer-readable instructions are executable by a processor to cause the processor to perform establishing a coordinate system with an origin being set at a center of a display screen. The coordinate system includes a coordinate plane in parallel to an average plane associated with the display screen. The computer-readable instructions are executable by a processor to cause the processor to further perform dividing the coordinate plane to four azimuth intervals with boundary lines being all intersected at the origin of the coordinate system. The four azimuth intervals correspond respectively to four display modes of an unage being displayed in four different orientations in the display screen. The computer-readable instructions are executable by a processor to cause the processor to additionally perform defining a respective buffer region in a respective angular range around a respective one of four boundary lines. The computer-readable instructions are executable by a processor to cause the processor to furthermore perform determining whether an azimuth angle of a gravity acceleration vector component in the coordinate plane during rotation of the display screen is kept in a respective azimuth interval corresponding to a display mode of the image currently displayed including two buffer regions respectively associated with two boundary lines of the respective azimuth interval. Optionally, upon a determination that the azimuth angle of the gravity acceleration vector component in the coordinate plane during rotation of the display screen is not kept in the respective azimuth interval corresponding to a display mode of the image currently displayed, the computer-readable instructions are executable by a processor to further cause the processor to perform 1) determining an actual azimuth interval of the four azimuth intervals where the gravity acceleration vector component in the coordinate plane is actually located due to the rotation of the display screen; 2) rotating the image in the display screen based on a display mode corresponding to the actual azimuth interval; and 3) determining two buffer regions associated with two boundary lines of the actual azimuth interval in the coordinate plane. Optionally, upon a determination that the azimuth angle of the gravity acceleration vector component in the coordinate plane during rotation of the display screen is kept in the respective azimuth interval corresponding to a display mode of the image currently displayed, the computer-readable instructions are executable by a processor to further cause the processor to perform prohibiting rotation of the image in the display screen.

In some embodiments, the computer-readable instructions are executable by a processor to further cause the processor to perform obtaining a value of a gravity acceleration vector component in the third axis; and determining whether the value is greater than a threshold value. Optionally, upon a determination that the value of the gravity acceleration vector component in the third axis is greater than a threshold value, the computer-readable instructions are executable by a processor to further cause the processor to perform setting one of the four azimuth intervals to be one corresponding to the display mode of the image currently displayed in the display screen according to a predetermined selection. Optionally, upon a determination that the value of the gravity acceleration vector component in the third axis is not greater than a threshold value, the computer-readable instructions are executable by a processor to further cause the processor to perform determining the respective azimuth interval where the gravity acceleration vector component in the coordinate plane is actually located to be one corresponding to the display mode currently displayed in the display screen.

In some embodiments, the computer-readable instructions are executable by a processor to further cause the processor to perform setting four boundary lines to separate the coordinate plane, setting a respective azimuth angle corresponding to a respective boundary line measured in the coordinate plane from at least one axis in a counterclockwise direction, and defining a first azimuth interval between a fourth boundary line and a first boundary line, a second azimuth interval between the first boundary line and a second boundary line, a third azimuth interval between the second boundary line and a third boundary-line, and a fourth azimuth interval between the third boundary line and the fourth boundary line.

In some embodiments, the computer-readable instructions are executable by a processes- to further cause the processor to perform defining a first preset angle measured in the coordinate plane from a respective boundary line in a counterclockwise direction and a second preset angle measured in the coordinate plane from the respective boundary line in a clockwise direction. The first preset angle is less than one half of an angular value associated with an azimuth interval having the respective boundary line and a first neighboring boundary line in the counterclockwise direction. The second preset angle is less than one half of an angular value associated with an azimuth interval having the respective boundary line and a second neighboring boundary line in the clockwise direction.

In some embodiments, the computer-readable instructions are executable by a processor to further cause the processor to perform determining a first angular range around a first one of the two boundary lines and a second angular range around a second one of the two boundary lines. The first angular range includes a first preset angle measured in the coordinate plane from the first one of the two boundary lines in a counterclockwise direction and a second preset angle measured in the coordinate plane from the first one of the two boundary lines in a clockwise direction. The second angular range includes a third preset angle measured in the coordinate plane from the second one of the two boundary lines in a counterclockwise direction and a fourth preset angle measured in the coordinate plane from the second one of the two boundary lines in a clockwise direction.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated it is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for controlling rotation of an image displayed in a display screen, comprising:
    establishing a coordinate system with an origin being set at a center of the display screen, the coordinate system including a coordinate plane in parallel to an average plane associated with the display screen;
    dividing the coordinate plane to four azimuth intervals with boundary lines being all intersected at the origin of the coordinate system, the four azimuth intervals corresponding respectively to four display modes of the image being displayed in four different orientations in the display screen;
    defining a respective buffer region in a respective angular range around a respective one of four boundary lines; and
    determining whether an azimuth angle of a gravity acceleration vector component in the coordinate plane during rotation of the display screen is kept in a respective azimuth interval corresponding to a display mode of the image currently displayed including two buffer regions respectively associated with two boundary lines of the respective azimuth interval.

2. The method of claim 1, upon a determination that the azimuth angle of the gravity acceleration vector component in the coordinate plane during rotation of the display screen is not kept in the respective azimuth interval corresponding to a display mode of the image currently displayed, further comprising:
    determining an actual azimuth interval of the four azimuth intervals where the gravity acceleration vector component in the coordinate plane is actually located due to the rotation of the display screen;
    rotating the image in the display screen based on a display mode corresponding to the actual azimuth interval; and
    determining two buffer regions associated with two boundary lines of the actual azimuth interval in the coordinate plane.

3. The method of claim 2, wherein rotating the image comprises redisplaying the image currently displayed in an alternative display mode corresponding to the actual azimuth interval where the gravity acceleration vector component in the coordinate plane is located, the image being displayed in the display screen in an orientation corresponding to the alternative display mode.

4. The method of claim 2, wherein determining two buffer regions associated with two boundary lines of the actual azimuth interval in the coordinate plane comprises determining a first angular range around a first one of the two boundary lines and a second angular range around a second one of the two boundary lines, the first angular range including a first preset angle measured in the coordinate plane from the first one of the two boundary lines in a counterclockwise direction and a second preset angle measured in the coordinate plane from the first one of the two boundary lines in a clockwise direction, the second angular range including a third preset angle measured in the coordinate plane from the second one of the two boundary lines in a counterclockwise direction and a fourth preset angle measured in the coordinate plane from the second one of the two boundary lines in a clockwise direction.

5. The method of claim 1, upon a determination that the azimuth angle of the gravity acceleration vector component in the coordinate plane during rotation of the display screen is kept in the respective azimuth interval corresponding to a display mode of the image currently displayed, further comprising prohibiting rotation of the image in the display screen.

6. The method of claim 1, wherein the display screen comprises a rectangular shape, the coordinate plane is an orthogonal one with a first axis being perpendicular to a second axis, and a third axis being normal to the display screen, the first axis being in parallel to a length direction of the display screen and the second axis being in parallel to a width direction of the display screen.

7. The method of claim 6, further comprising obtaining a value of a gravity acceleration vector component in the third axis;
   determining whether the value is greater than a threshold value;
   upon a determination that the value is greater than a threshold value, setting one of the four azimuth intervals to be one corresponding to the display mode of the image currently displayed in the display screen according to a predetermined selection; and
   upon a determination that the value is not greater than a threshold value, determining the respective azimuth interval where the gravity acceleration vector component in the coordinate plane is actually located to be one corresponding to the display mode currently displayed in the display screen.

8. The method of claim 1, wherein dividing the coordinate plane to four azimuth intervals comprises setting four boundary lines to separate the coordinate plane and setting a respective azimuth angle corresponding to a respective boundary line measured in the coordinate plane from at least one axis in a counterclockwise direction, defining a first azimuth interval between a fourth boundary line and a first boundary line, a second azimuth interval between the first boundary line and a second boundary line, a third azimuth interval between the second boundary line and a third boundary line, and a fourth azimuth interval between the third boundary line and the fourth boundary line; wherein the first boundary line is defined by a first azimuth angle of about 45 degrees, the second boundary line is defined by a second azimuth angle of about 135 degrees, the third boundary line is defined by a third azimuth angle of about 225 degrees, and the fourth boundary line is defined by a fourth azimuth angle of about 315 degrees.

9. The method of claim 8, wherein defining a respective buffer region around a respective one of the four boundary lines comprises defining a first preset angle measured in the coordinate plane from a respective boundary line in a counterclockwise direction and a second preset angle measured in the coordinate plane from the respective boundary line in a clockwise direction, wherein the first preset angle is less than one half of an angular value associated with an azimuth interval having the respective boundary line and a first neighboring boundary line in the counterclockwise direction and the second preset angle is less than one half of an angular value associated with an azimuth interval having the respective boundary line and a second neighboring boundary line in the clockwise direction.

10. A sensing apparatus embedded in a display apparatus for controlling rotation of an image displayed in a display screen thereof, comprising:
   a memory configured to store pre-loaded programs containing one or more computer-executable instructions;
   a gravity sensor configured to measure a gravity acceleration vector; and
   a processor coupled to the memory and the gravity sensor and configured to process the gravity acceleration vector and execute the one or more computer-executable instructions to:
      establish a coordinate system with an origin being set at a center of the display screen, the coordinate system including a coordinate plane in parallel to an average plane associated with the display screen;
      divide the coordinate plane to four azimuth intervals with boundary lines being all intersected at the origin of the coordinate system, the four azimuth intervals corresponding respectively to four display modes of the image being displayed in four different orientations in the display screen;
      define a respective buffer region in a respective angular range around a respective one of four boundary lines; and
      determine whether an azimuth angle of a component of the gravity acceleration vector in the coordinate plane during rotation of the display screen is kept in a respective azimuth interval corresponding to a display mode of the image currently displayed including two buffer regions respectively associated with two boundary lines of the respective azimuth interval.

11. The sensing apparatus of claim 10, wherein, upon a determination that the azimuth angle of the gravity acceleration vector component in the coordinate plane during rotation of the display screen is not kept in the respective azimuth interval corresponding to a display mode of the image currently displayed, the processor is configured to execute the one or more computer-executable instructions to:
   determine an actual azimuth interval of the four azimuth intervals where the gravity acceleration vector component in the coordinate plane is actually located due to the rotation of the display screen;
   rotate the image in the display screen based on a display mode corresponding to the actual azimuth interval; and
   determine two buffer regions associated with two boundary lines of the actual azimuth interval in the coordinate plane.

12. The sensing apparatus of claim 11, the processor is further configured to execute the one or more computer-executable instructions to redisplay the image currently displayed in an alternative display mode corresponding to the actual azimuth interval where the gravity acceleration vector component in the coordinate plane is located, the image being displayed in the display screen in an orientation corresponding to the alternative display mode, thereby rotating the image;
   the processor is further configured to execute the one or more computer-executable instructions to determine a first angular range around a first one of the two boundary lines and a second angular range around a second one of the two boundary lines, wherein the first angular range includes a first preset angle measured in the coordinate plane from the first one of the two boundary lines in a counterclockwise direction and a second preset angle measured in the coordinate plane from the first one of the two boundary lines in a clockwise direction; and the second angular range includes a third preset angle measured in the coordinate plane from the second one of the two boundary lines in a counterclockwise direction and a fourth preset angle measured in the coordinate plane from the second one of the two boundary lines in a clockwise direction.

13. The sensing apparatus of claim 10, upon a determination that the azimuth angle of the gravity acceleration vector component in the coordinate plane during rotation of the display screen is kept in the respective azimuth interval corresponding to a display mode of the image currently displayed, the processor is configured to execute the one or more computer-executable instructions to prohibit rotation of the image in the display screen.

14. The sensing apparatus of claim 10, wherein the coordinate system is an orthogonal coordinate system having a first axis and a second axis laying in the coordinate plane perpendicularly intersected at the origin and a third axis perpendicular to the coordinate plane.

15. The sensing apparatus of claim 14, wherein the gravity sensor is configured to measure a value of a component of the gravity acceleration vector in the third axis and the processor is configured to determine whether the value is greater than a threshold value determine an actual azimuth interval based on an azimuth angle of a component of the gravity acceleration vector is actually located in the coordinate plane.

16. The sensing apparatus of claim 15, wherein, upon a determination that the value is not greater than a threshold value, the processor is further configured to execute the one or more computer-executable instructions to determine an actual azimuth interval based on an azimuth angle of a component of the gravity acceleration vector is actually located in the coordinate plane; upon a determination that the value is greater than a threshold value, the processor is further configured to execute the one or more computer-executable instructions to determine one of the four azimuth intervals to be one corresponding to the image currently being displayed in a display mode based on a predetermined option stored in the memory.

17. The sensing apparatus of claim 10, wherein the processor is further configured to execute the one or more computer-executable instructions to:
set four boundary lines to separate the coordinate plane;
set a respective azimuth angle corresponding to a respective boundary line measured in the coordinate plane from at least one axis in a counterclockwise direction;
define a first azimuth interval between a fourth boundary line and a first boundary line, a second azimuth interval between the first boundary line and a second boundary line, a third azimuth interval between the second boundary line and a third boundary line, and a fourth azimuth interval between the third boundary line and the fourth boundary line;
thereby dividing the coordinate plane to four azimuth intervals;
wherein the first boundary line is defined by a first azimuth angle of about 45 degrees, the second boundary line is defined by a second azimuth angle of about 135 degrees, the third boundary line is defined by a third azimuth angle of about 225 degrees, and the fourth boundary line is defined by a fourth azimuth angle of about 315 degrees.

18. The sensing apparatus of claim 17, wherein the processor is further configured to execute the one or more computer-executable instructions to define a first preset angle measured in the coordinate plane from a respective boundary line in a counterclockwise direction and a second preset angle measured in the coordinate plane from the respective boundary line in a clockwise direction, thereby defining a respective buffer region around a respective one of the four boundary lines;
wherein the first preset angle is less than one half of an angular value associated with an azimuth interval having the respective boundary line and a first neighboring boundary line in the counterclockwise direction; and
the second preset angle is less than one half of an angular value associated with an azimuth interval having the respective boundary line and a second neighboring boundary line in the clockwise direction.

19. A display apparatus comprising a display screen, a display driver configured to drive the display screen to display an image in at least one of four display modes, and a sensing apparatus of claim 10 configured to control rotation of the image displayed in the display screen from one display mode to another.

20. A computer-program product comprising a non-transitory tangible computer-readable medium having computer-readable instructions thereon, the computer-readable instructions being executable by a processor to cause the processor to perform:
establishing a coordinate system with an origin being set at a center of a display screen, the coordinate system including a coordinate plane in parallel to an average plane associated with the display screen;
dividing the coordinate plane to four azimuth intervals with boundary lines being all intersected at the origin of the coordinate system, the four azimuth intervals corresponding respectively to four display modes of an image being displayed in four different orientations in the display screen;
defining a respective buffer region in a respective angular range around a respective one of four boundary lines; and
determining whether an azimuth angle of a gravity acceleration vector component in the coordinate plane during rotation of the display screen is kept in a respective azimuth interval corresponding to a display mode of the image currently displayed including two buffer regions respectively associated with two boundary lines of the respective azimuth interval.

* * * * *